(12) United States Patent
Ishigaki

(10) Patent No.: US 8,698,347 B2
(45) Date of Patent: Apr. 15, 2014

(54) POWER UNIT

(75) Inventor: Hirosato Ishigaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 658 days.

(21) Appl. No.: 12/967,219

(22) Filed: Dec. 14, 2010

(65) Prior Publication Data

US 2011/0139595 A1  Jun. 16, 2011

(30) Foreign Application Priority Data

Dec. 14, 2009 (JP) .................. 2009-282751

(51) Int. Cl.
*B60L 1/00* (2006.01)
*B60L 3/00* (2006.01)
*H02G 3/00* (2006.01)

(52) U.S. Cl.
USPC ........... 307/9.1; 307/10.1; 307/10.7; 307/110

(58) Field of Classification Search
USPC .......................................... 307/9.1
See application file for complete search history.

(56) References Cited

U.S. PATENT DOCUMENTS 8,441,224 B2 * 5/2013 Sumi et al. .................... 318/801

FOREIGN PATENT DOCUMENTS

JP  2006224772 A  8/2006
JP  2009090818 A  4/2009

OTHER PUBLICATIONS

Toyota Technical Publication (Toyota Gijutsu Kokaishu) TKO 20086.

* cited by examiner

*Primary Examiner* — Rexford Barnie
*Assistant Examiner* — Toan Vu
(74) *Attorney, Agent, or Firm* — Gifford, Krass, Sprinkle, Anderson & Citkowski, P.C.

(57) ABSTRACT

In order to discharge electrical charges from a smoothing capacitor even if no discharge command is issued by a control system, making use of the displacement of a power unit in the event of a collision, a movable electrode is connected to a first contact connected to a high-potential bus, and the smoothing capacitor is connected with a converter and an inverter to be in parallel in the case where an engagement rod is positioned by a retaining ring. Further, when the engagement rod is disengaged from the retaining ring and removed from a relay, the movable electrode is held in contact with a second contact by a pressure spring, and the electrical charge remaining in the smoothing capacitor is discharged to a low-potential bus through a discharge portion.

5 Claims, 7 Drawing Sheets

POWER UNIT

CROSS-REFERENCE TO RELATED APPLICATIONS

The present application claims priority of Japanese Patent Application No. 2009-282751 filed on Dec. 14, 2009, which is incorporated herein by reference in its entirety including the specification, drawings and abstract.

BACKGROUND OF THE INVENTION

1. Field of the Invention

The invention relates to a power unit for a vehicle, and more particularly, to a power unit that discharges electrical charge from a smoothing capacitor in the event of a collision of a vehicle.

2. Description of the Related Art

In recent years, vehicles such as hybrid vehicles, fuel-cell-powered vehicles and the like, each having a power train in which an engine or a fuel cell or the like combined with an electric motor, have been developed and put into practical use. In such hybrid vehicles, the direct-current power of a battery is converted into alternating-current power by an inverter and then supplied to an alternating-current motor to drive the vehicle. Further, when the charge amount of the battery has decreased, the alternating-current motor is driven by an engine, and alternating-current power generated by the alternating-current motor (hereinafter referred to as a motor-generator) is converted to direct-current power by the inverter to charge the battery.

When the vehicle is driven using the motor-generator, the efficiency of driving the vehicle increases as the voltage of the battery increases. Therefore, the vehicle is equipped with a high-voltage circuit, such as a converter or the like, to raise the voltage of direct-current power supplied from the battery to a high-voltage direct-current power, and the high-voltage direct-current power is supplied to the inverter. It should be noted that such a high-voltage circuit may include a smoothing capacitor to smooth the direct-current power or reduce noise and the like, and hence includes a mechanism for discharging electrical charges (a high-voltage power) remaining on the smoothing capacitor or the like upon stoppage of the operation of the vehicle or in an emergency.

For example, Japanese Patent Application Publication No. 2006-224772 (JP-A-2006-224772) describes a power unit for a vehicle that is equipped with discharge means for discharging high-voltage power remaining in a high-voltage circuit and on a smoothing capacitor or the like after the supply of a power from a battery is stopped upon detection of a collision of the vehicle. The power unit interrupts the supply of direct-current power from the battery to the high-voltage circuit by means of a system main relay if a collision of the vehicle is detected, and turns on a discharge relay that connects the smoothing capacitor in series with a resistor to discharge electrical charge remaining in the smoothing capacitor. The power unit ensures safety about the high-voltage power through this operation.

However, in the described power unit, the control of the system main relay and the control of the discharge relay are required in the event of a collision. It is therefore required that a control system survive to discharge electrical charge from the smoothing capacitor even during and after a collision through an improvement in the collision survivability performance of the power unit. In Japanese Patent Application Publication No. 2009-90818 (JP-A-2009-90818) an art for enhancing the survivability of the control system is described.

Specifically, JP-A-2009-90818 describes an art for reducing the damage to on-vehicle components such as an inverter and the like by restraining the on-vehicle components from colliding with other members or the like in the event of a collision of a vehicle, to improve the collision survivability performance of a power unit.

In the related art, there are four methods of ensuring safety about the high voltage of a vehicle, namely, (A) the protection against direct contact with a high-voltage portion, (B) the protection against indirect contact with the high-voltage portion, (C) the reduction in voltage/energy of the high-voltage portion in the event of breakage of the power unit, and (D) the securement of an insulating resistance through the mounting of the high-voltage portion at such a position as to prevent breakage in the event of a collision. In this case, as regards the methods (A) and (B), safety is ensured by providing an insulating cover for the high-voltage portion, an interlock mechanism, or the like. Further, as regards the method (C), there is a measure based on collision detection and a discharge treatment as described in JP-A-2006-224772. As regards the method (D), there is an improvement in anti-collision performance or the like as described in JP-A-2009-90818.

However, in the power unit described in JP-A-2006-224772 it is required that a collision be detected, and that the control system survive even during and after the collision to perform the treatment of discharging electrical charge from the smoothing capacitor. Thus, for example, it is necessary to double the circuit or improve the collision survivability performance of the circuit. However, an increase in the cost of the circuit may be entailed. Further, as an alternative to the idea of doubling the circuit or the like, there is also a method of completing discharge instantaneously in the event of a collision. However, a large discharge resistor is needed to terminate the discharge of a high-voltage power in a short time.

Furthermore, there is also a method of reinforcing a mechanical structure of a control system of a power unit to prevent the control system from being damaged and a method of restraining on-vehicle components from colliding with other members or the like as disclosed in Japanese Patent Application Publication No. 2009-90818 (JP-A-2009-90818). However, in addition to the difficulty in reducing the size of the components, an increase in cost and a deterioration in vehicle mountability may be caused.

SUMMARY OF THE INVENTION

The invention provides a power unit that enables the discharge of a high-voltage power from a smoothing capacitor even when no discharge command is issued by a control system, making use of the displacement of the power unit in the event of a collision, and that can ensure a reduction in cost and safety in the event of the collision through the minimization of discharge means.

A power unit according to a first aspect of the invention relates to a power unit that is fixed to a mounting platform of the vehicle, and that has a converter that boosts a voltage of a battery, an inverter that supplies the boosted voltage supplied by the converter to a rotating electrical machine to drive a vehicle, a smoothing capacitor connected with the converter and the inverter to be in parallel, and a relay for discharging electrical charge accumulated in the smoothing capacitor. The mounting platform has a displacement portion that unfixes the power unit by pressing the power unit in the longitudinal direction from the front to the rear of the vehicle and that displaces a position of the power unit along a guide member extending backward with respect to the vehicle, and an insulating engagement rod provided on the mounting platform and protruding in the longitudinal direction from the front to the rear of the vehicle. The relay connects the smoothing capacitor with the converter and the inverter to be in parallel when the power unit is fixed and the engagement rod of the mounting platform is inserted in the relay, and breaks parallel connection through disengagement of the engagement rod from the relay, which results from unfixing and displacement of the power unit, to connect the smoothing capacitor to a discharge portion that discharges electrical charge accumulated in the smoothing capacitor. Owing to this configuration, a processing conventionally dependent on a control system can be substituted for by a simple configuration. As a result, an increase in reliability and a reduction in cost are made possible.

Further, in the power unit according to the foregoing aspect of the invention, the engagement rod inserted in the relay may have a conical tip, the relay may have a movable electrode located on a high-potential side of the smoothing capacitor and made movable through insertion and removal of the engagement rod, a high-potential electrode located on high-potential sides of the inverter and the converter to come into contact with the movable electrode through insertion of the engagement rod, and a low-potential electrode connected to a discharge portion that is insulated from the movable electrode through insertion of the engagement rod, and the movable electrode located on the high-potential side of the smoothing capacitor may separate from the high-potential electrode and come into contact with the low-potential electrode due to removal of the engagement rod resulting from displacement of the power unit, so that the smoothing capacitor and the discharge portion are electrically connected to each other. The engagement rod is usually inserted in the relay and prevented from falling out therefrom by a positioning member when an operational force smaller than a predetermined load is applied to the power unit. Thus, a malfunction is prevented from being caused by inadvertent removal.

Further, the movable electrode may be made movable by a spring-like electrode or an elastic force of an elastic body, and may come into contact with the low-potential electrode due to the elastic force.

Furthermore, the discharge portion may be a resistor. Further, the discharge portion may be a normal wiring.

By using the power unit according to the invention, an effect of allowing electrical charge to be discharged from the smoothing capacitor even when no discharge command is issued by the control system in the event of a collision, making use of the displacement of the power unit in the event of the collision is achieved.

BRIEF DESCRIPTION OF THE DRAWINGS

The foregoing and further features and advantages of the invention will become apparent from the following description of example embodiments of the invention with reference to the accompanying drawings, wherein like numerals are used to represent like elements, and wherein.

DETAILED DESCRIPTION OF EMBODIMENTS

Best modes for carrying out the invention (hereinafter referred to as embodiments of the invention) will be described hereinafter with reference to the drawings.

Figure 1:
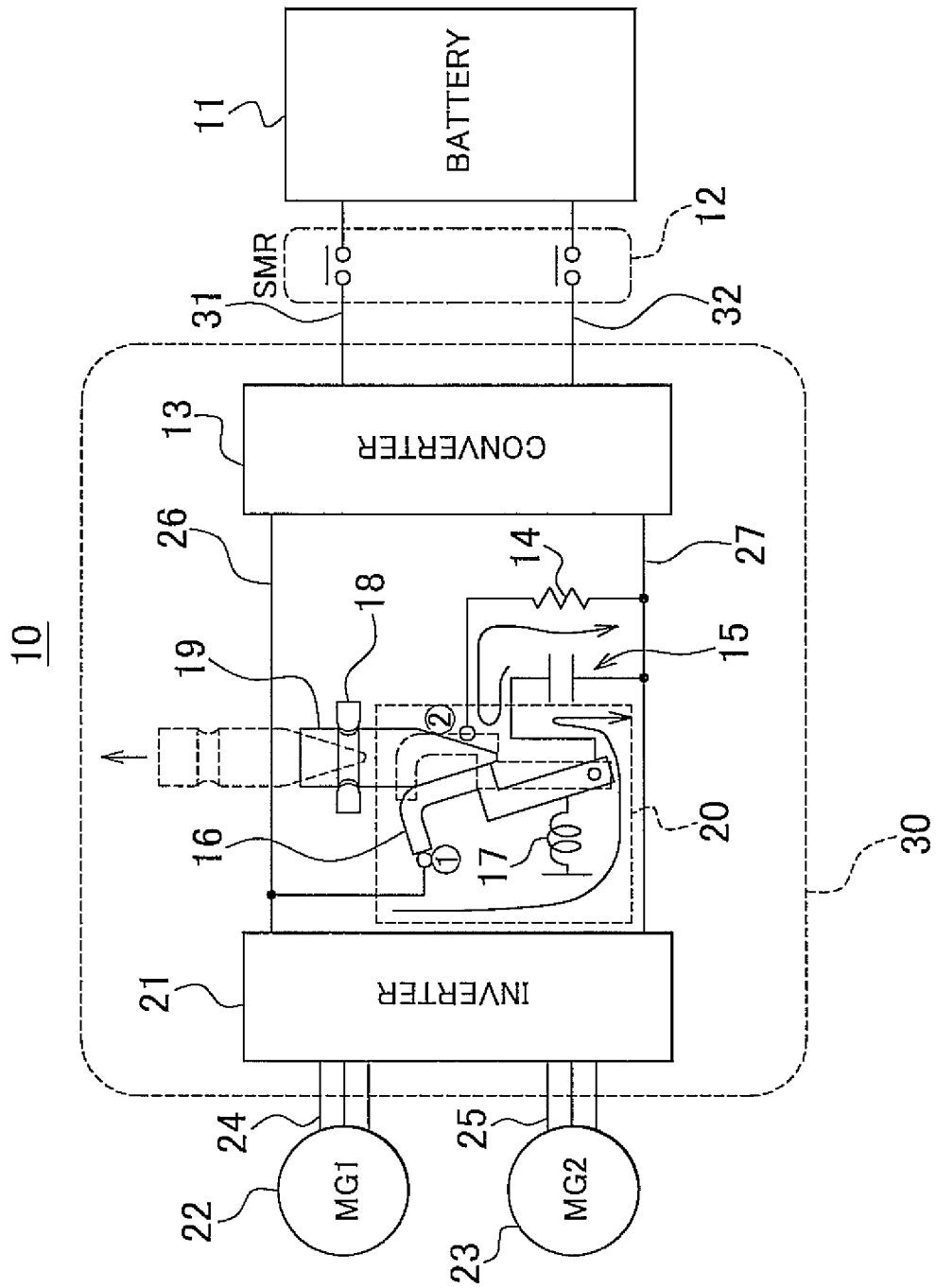
FIG. 1 is a block diagram showing the configuration of a power unit mounted on a vehicle according to a first embodiment of the invention.
Figure 2:
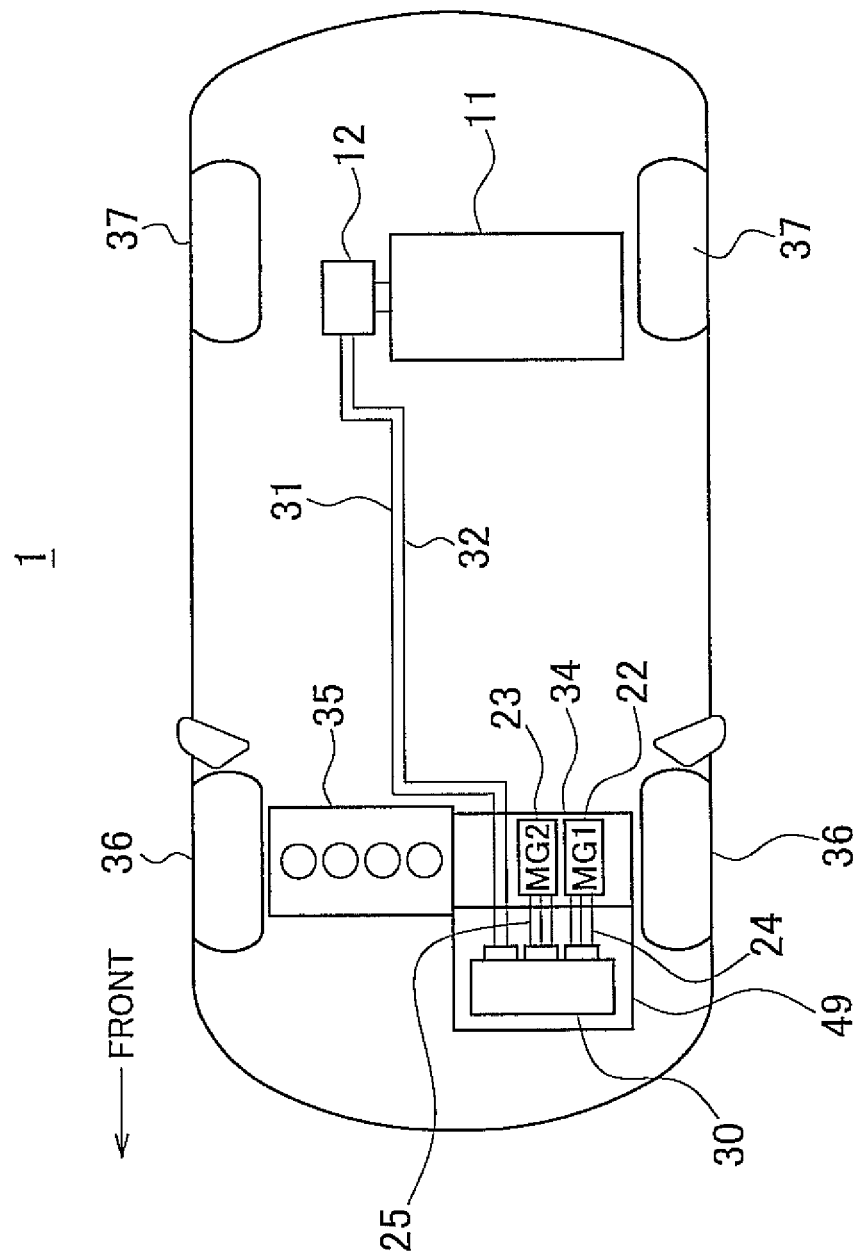
FIG. 2 is a schematic view showing a mounting position of the power unit according to the first embodiment of the invention.

FIG. 1 shows the configuration of a power unit according to a first embodiment of the invention, mounted on a vehicle, and FIG. 2 shows the mounting position of the power unit of FIG. 1. First, the power unit according to the first embodiment of the invention will be outlined using FIG. 2. A vehicle 1 of FIG. 2 includes an engine 35; a first motor-generator 22 (MG1) connected to the engine 35; a second motor-generator 23 (MG2); a transaxle 34 that transmits driving forces of the engine 35, the MG1 and the MG2 to front wheels 36; rear wheels 37; a battery 11 mounted on a rear portion of the vehicle; and a power control unit 30 mounted in front of the transaxle 34 with respect to the vehicle. A system main relay 12 is connected to the battery 11 on the rear portion of the vehicle. The system main relay 12 is connected to the power control unit 30 by a high-potential cable 31 and a low-potential cable 32. The power control unit (hereinafter referred to as the PCU or the power unit) is connected to the motor-generators, namely, the MG1 22 and the MG2 23 by MG cables 24 and 25 respectively.

The power control unit 30 (the PCU) is fixed to the vehicle via a mounting platform 49 provided on the transaxle 34. In the event of a collision of the vehicle 1, the PCU 30 is pressed by a colliding object to be displaced backward with respect to the vehicle. However, the mounting platform 49 fixed to the transaxle 34 is displaced by a smaller amount than the PCU 30. Hence, there is a relative displacement amount between the mounting platform 49 and the PCU 30. Thus, a power supply system 10 according to the embodiment operates a discharge relay using the relative displacement amount between the mounting platform 49 and the PCU 30 in the event of a collision to discharge electrical charge remaining in the smoothing capacitor. By adopting this configuration, electrical charge may be discharged from the smoothing capacitor without employing a control system for detecting a collision and discharging electrical charge. In addition, an effect of reducing the possibility of other mounted components colliding with the PCU 30 without applying an unnecessary tensile force to a group of cables connected to the PCU 30 is achieved.

Next, the configuration of the power supply system 10 will be described in detail with reference to FIG. 1. The power supply system 10 includes the battery 11, an SMR 12 connected to the battery 11, a converter 13 connected to the battery 11 via the high-potential cable 31 and the low-potential cable 32 that extend from the SMR 12, an inverter 21 connected via a high-potential bus 26 and a low-potential bus 27 that extend from the converter, the MG1 22 and the MG2 23 that are connected to the inverter 21, a discharge relay 20, and a smoothing capacitor 15 and a discharge resistor 14 that are connected to the discharge relay 20. It should be noted that an insulating pin-shaped engagement rod 19 provided on the mounting platform is inserted in the discharge relay 20 and positioned by a retaining ring 18, in the case where the power control unit 30 is fixed to the vehicle via a mounting platform 49. The engagement rod 19 has a conical tip, and a cylindrical trunk portion in which a groove where the retaining ring is fitted is provided in the outer periphery of the cylindrical trunk portion.

One end of a movable electrode 16 of the relay 20 is switchable to a first contact and a second contact, the other end of the movable electrode is connected to one end of the smoothing capacitor 15, and the other end of the smoothing capacitor 15 is connected to the low-potential bus 27. Further, the first contact of the relay 20 is connected to the high-potential bus 26, one end of the discharge resistor 14 is connected to the second contact of the relay 20, and the other end of the resistor 14 is connected to the low-potential bus 27. Further, the movable electrode 16 assumes such a shape as to smoothly come into contact with the engagement rod 19, and is pressed toward the second contact by an electrically insulated pressure spring 17.

If the engagement rod 19 is positioned by the retaining ring 18, the movable electrode 16 connects to the first contact connected to the high-potential bus 26, and connects the smoothing capacitor 15 with the converter 13 and the inverter 21 to be in parallel. Further, if the engagement rod 19 is disengaged from the retaining ring 18 and removed from the relay 20, the pressure spring 17 causes the movable electrode 16 to come into contact with the second contact, and electrical charge remaining in the smoothing capacitor 15 is discharged to the low-potential bus 27 through the discharge resistor 14.

Figure 3:
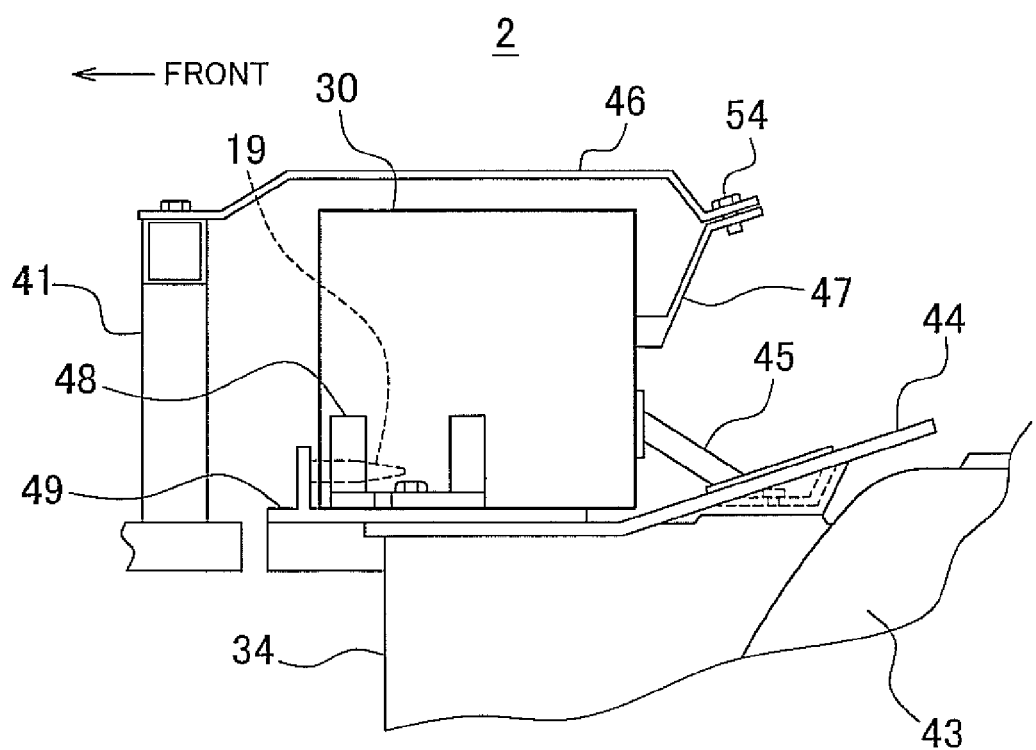
FIG. 3 is a lateral view showing a fixation structure of a power control unit of FIG. 2 as viewed from the side of the vehicle.
Figure 4:
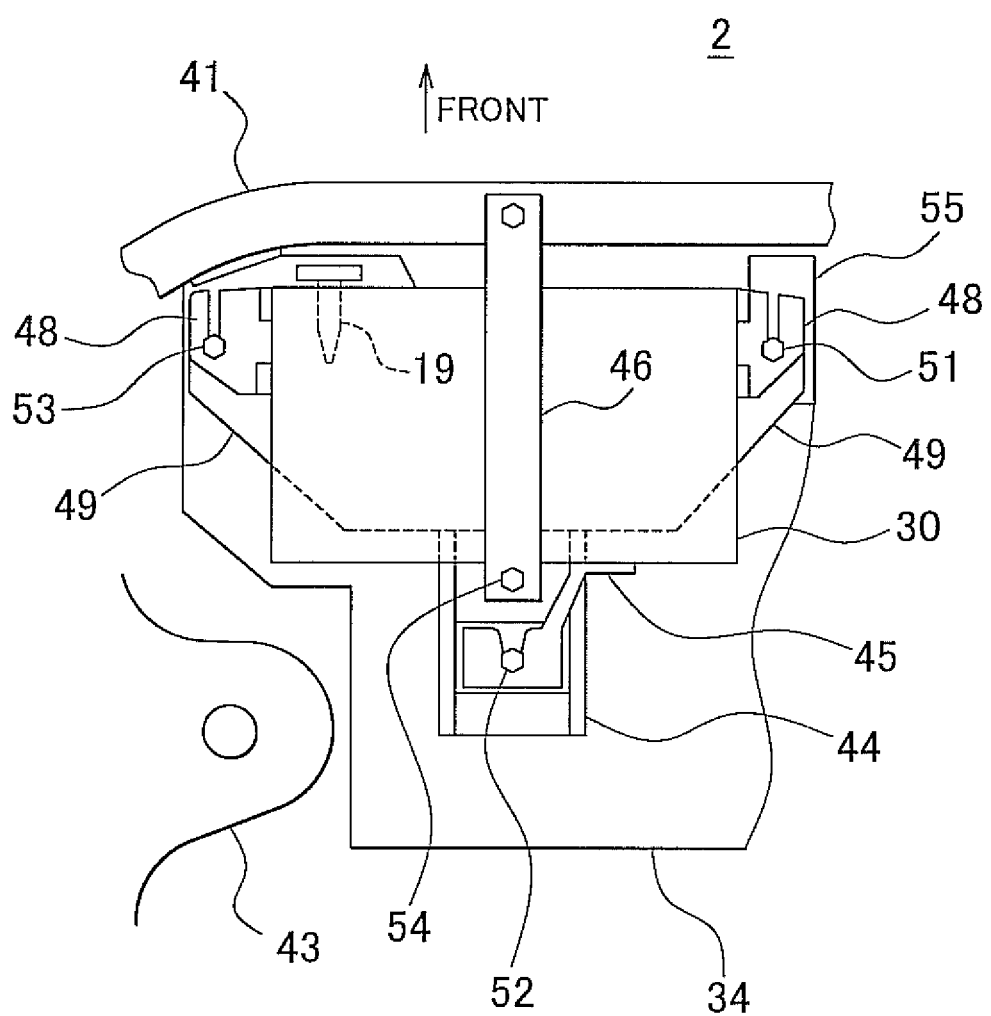
FIG. 4 is a top view showing the fixation structure of the power control unit of FIG. 2 as viewed from above the vehicle.

FIG. 3 shows a fixation structure of the power control unit (the PCU) of FIG. 2 as viewed from the side of the vehicle, and FIG. 4 is a top view of the fixation structure of the PCU of FIG. 2. The fixation structure of the PCU 30 will be described in detail using FIGS. 3 and 4.

The mounting platform 49 fixed on the transaxle 34 of FIG. 3 is provided with the insulating engagement rod 19 fitted in the discharge relay, a plurality of couplers that are decoupled when a predetermined press force is applied thereto in the longitudinal direction from the front to the rear of the vehicle, and a guide plate 44 that guides the PCU 30 backward with respect to the vehicle. Each coupler is provided with a coupling plate 45, the tip of which is disposed behind the PCU 30 and fitted in an indentation in the guide plate to be locked, a lateral portion coupling plate 48 disposed on a lateral face of the PCU 30, an upper support plate 46 that displaces the PCU 30 upward, and an upper coupling plate 47 that couples the rear of the PCU 30 to the upper support plate 46.

The PCU 30 in FIG. 4 is fixed to the mounting platform 49 by four coupling bolts 51 to 54. The first coupling bolt 52 is located at the tip of the coupling plate 45, which is fitted in the indentation of the guide plate, the second and third coupling bolt 51, 53 are located on the lateral portion coupling plate 48 of the PCU 30, and the fourth coupling bolt 54 is located behind the upper support plate 46. These coupling plates are provided respectively with holes that extend in the forward direction of the vehicle. This configuration is intended to displace the PCU 30 in the longitudinal direction from the front to the rear of the vehicle along the holes of the coupling plates and the guide plate 44 even if the PCU 30 receives an impact from an offset frontal collision. By adopting this configuration, the engagement rod 19 may be smoothly taken out. Further, the coupling plates are made lower in strength than the mounting platform 49 and the guide plate 44. In this structure, therefore, the coupling bolts are disengaged without deforming the mounting platform 49 or the PCU 30 even if the PCU 30 is subjected to impact forces from a frontal collision.

Figure 5:
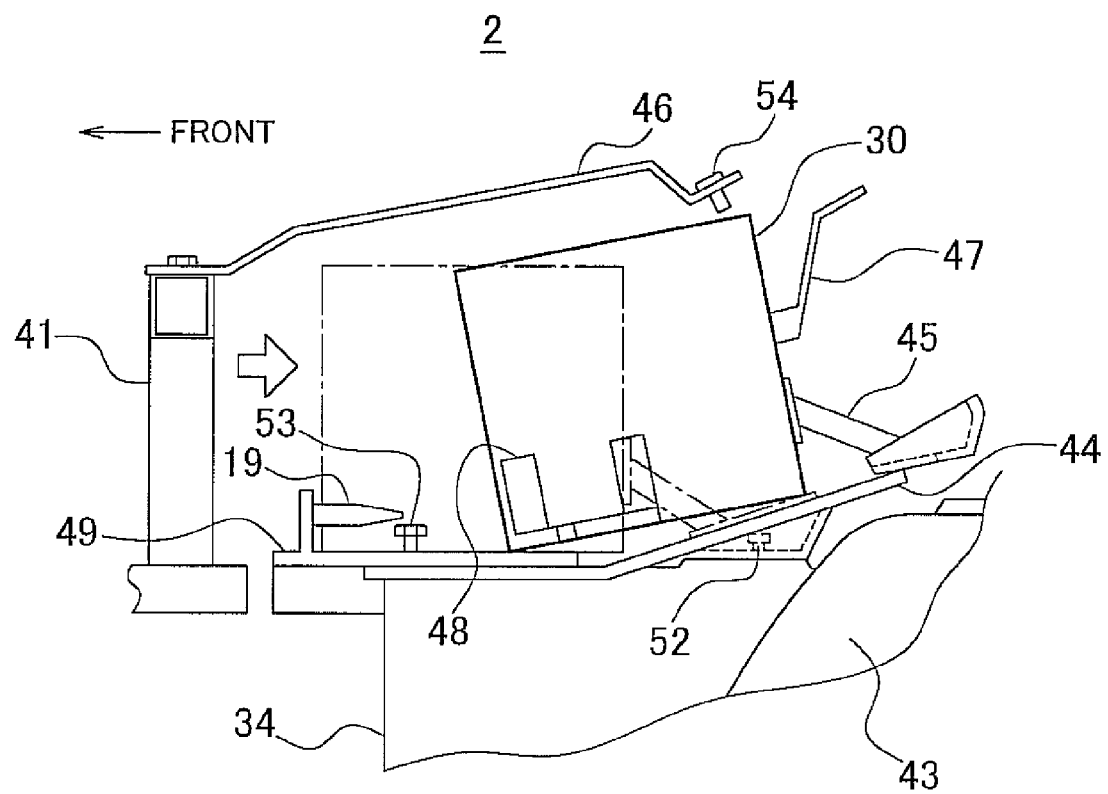
FIG. 5 is a lateral view showing the fixation structure when the power control unit of FIG. 3 is pressed in the longitudinal direction from the front to the rear of the vehicle.

FIG. 5 shows a decoupling state at the time when the PCU 30 is pressed in the longitudinal direction from the front to the rear of the vehicle with a predetermined force. A characteristic feature of the decoupled fixation structure is that the insulating engagement rod 19 fitted in the discharge relay is disengaged to discharge electrical charge in the smoothing capacitor due to the relative displacement amount between the PCU 30 and the mounting platform 49 resulting from the displacement of the PCU 30 on the mounting platform 49 caused by the impact to the PCU 30 from the front of the vehicle, without necessitating any processing by a control system. In addition, another characteristic feature is that the PCU 30 is guided by the guide plate 44 diagonally upward to prevent deformation of the couplers coupling the PCU 30 to the mounting platform 49, and to avoid a collision of the PCU 30 with other mounted components.

The coupling plate 45 of FIG. 5 supports the PCU 30 from behind, and slides on the guide plate 44 when the PCU 30 is pressed in the longitudinal direction from the front to the rear of the vehicle with a predetermined force. The PCU 30 is thereby displaced to disengage the insulating engagement rod 19 fitted in the discharge relay and thereby discharge residual electrical charge from the smoothing capacitor. While the employment of the coupling plate 45 makes it possible to set the press force leading to the operation of the discharge relay and to set the operation displacement amount of the discharge relay large, the employment of the coupling plate 45 may hinder a further simplification and reduction in the size of the fixation structure 2. Thus, as a modified example of the first embodiment, a slippage structure may be adopted in which the coupling plate 45 and the guide plate 44 are disused, instead, the mounting platform 49 is extended in the longitudinal direction from the front to the rear of the vehicle to allow the PCU 30 to be guided, and the mounting platform 49 and the PCU 30 abut on each other to generate a preset frictional force. Because of this structure, a function similar to the function of the coupling plate 45 and the guide plate 44 can be realized, and the size of the fixation structure 2 may be further reduced by adjusting the frictional force in accordance with the displacement caused by slippage.

Figure 6:
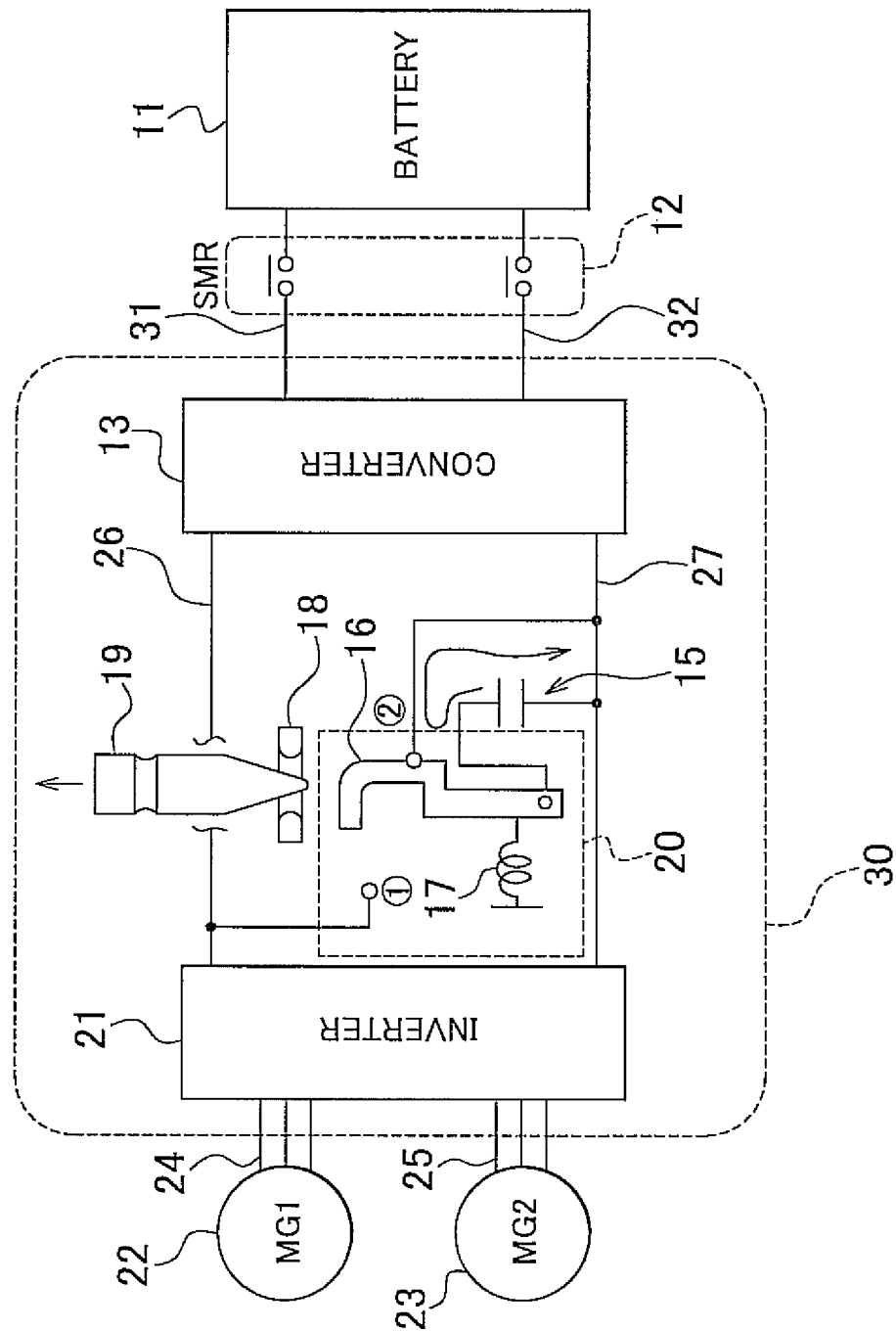
FIG. 6 is a block diagram showing the configuration of the power unit of FIG. 1 in which the discharge resistor is omitted.

The configuration of the power supply system 40 shown in FIG. 6 does not include a discharge resistor. When a collision occurs, the engagement rod 19 fitted in the relay 20 is disengaged from the retaining ring 18, and the movable electrode 16 thereby switches over the high-potential side of the smoothing capacitor 15 to the low-potential bus 27 as the low-potential side to discharge electrical charge from the smoothing capacitor 15. In this circuitry, normal connection is not established. Therefore, even if the SMR 12 remains connected to the battery 11, the voltage of the battery is not applied to the discharge resistor. Even if the resistor is omitted and connection is realized only by the direct cable, no inconvenience resulting from an over-current is caused.

Figure 7:
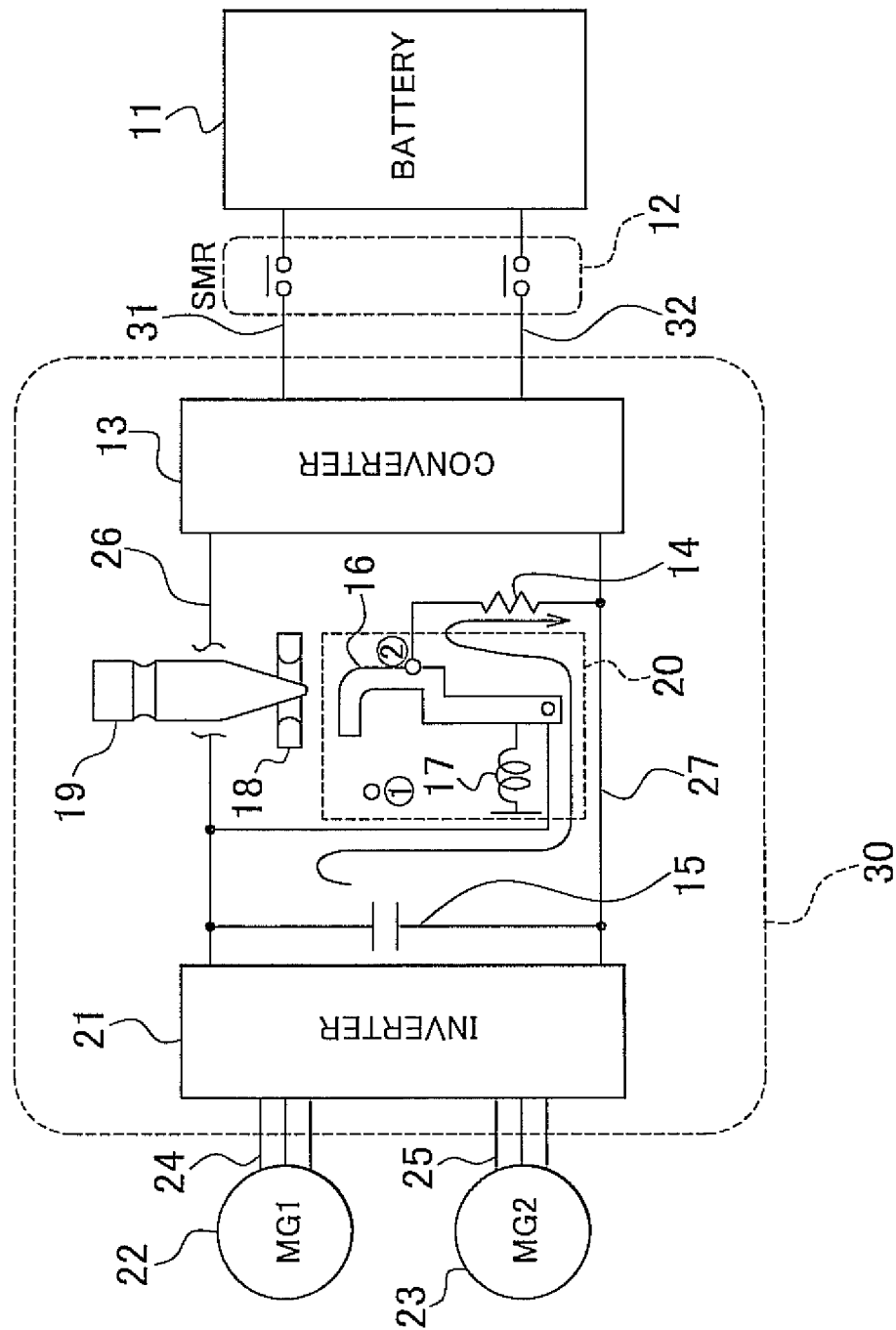
FIG. 7 is a block diagram showing the configuration of another embodiment of the invention that serves as a reference in understanding the configuration of the power unit of FIG. 6.

In contrast, FIG. 7 shows another embodiment that serves as a reference in understanding the second embodiment of the invention. The power supply system 50 of FIG. 7 has a circuit in which the discharge relay 20 and the resistor 14 are connected in series with each other to discharge electrical charge remaining in the smoothing capacitor 15. The power supply system 50 discharges electricity from the smoothing capacitor 15 through the relay 20 after the SMR 12 is disconnected from the battery 11 by the control system. Therefore, a discharge resistor is indispensable in the event the SMR 12 cannot be disconnected from the battery.

As is apparent from the power supply system 40 of FIG. 6, the resistor 14 employed in the power supply system 10 of FIG. 1 in this embodiment of the invention may be omitted. Therefore, the size and cost of the power supply system may be further reduced.

As described above, by employing a power unit according to this embodiment of the invention, electricity may be discharged from the smoothing capacitor even if the control system has not issued a discharge command thereby facilitating simplification of the control system and a reduction in production cost.

It should be noted that although this embodiment of the invention has been described in the context of a hybrid vehicle, the invention may also be applied to other vehicle types, such as, for example fuel-cell-powered vehicles, and electric vehicles as well.

While the invention has been described with reference to the example embodiments thereof, it is to be understood that the invention is not restricted to the described embodiments or constructions. To the contrary, the invention is intended to cover various modifications and equivalent arrangements. In addition, while the various elements of the example embodiments of the invention are shown in various combinations and configurations, other combinations and configurations, including more, less or only a single element, are also within the scope of the invention.

What is claimed is:

1. A power unit that is fixed to a mounting platform of a vehicle, the power unit comprising:
   a converter that boosts a voltage of a battery;
   an inverter that supplies the boosted voltage supplied by the converter to a rotating electrical machine to drive the vehicle;
   a smoothing capacitor that is connected with the converter and the inverter to be in parallel; and
   a relay that discharges electrical charge accumulated in the smoothing capacitor, wherein
   the mounting platform includes a displacement portion that unfixes the power unit by pressing the power unit in the longitudinal direction from the front to the rear of the vehicle and that displaces the power unit along a guide member that extends toward the rear of the vehicle, and an insulating engagement rod provided on the mounting platform that protrudes in the longitudinal direction from the front to the rear of the vehicle, and
   the relay connects the smoothing capacitor with the converter and the inverter to be in parallel when the power unit is fixed and the engagement rod of the mounting platform is inserted in the relay, and breaks the parallel connection by disengaging the engagement rod from the relay when the power unit is unfixed and displaced, to connect the smoothing capacitor to a discharge portion that discharges electrical charge accumulated in the smoothing capacitor.

2. The power unit according to claim 1, wherein
   the engagement rod inserted in the relay has a conical tip;
   the relay includes a movable electrode that is connected to a high-potential side of the smoothing capacitor and made movable through insertion and removal of the engagement rod, a high-potential electrode, connected to high-potential sides of the inverter and the converter, that contacts the movable electrode through insertion of the engagement rod, and a low-potential electrode, connected to a discharge portion, that is insulated from the movable electrode through insertion of the engagement rod; and
   the movable electrode connected to the high-potential side of the smoothing capacitor separates from the high-potential electrode and comes into contact with the low-potential electrode due to removal of the engagement rod resulting from displacement of the power unit, so that the smoothing capacitor becomes electrically connected to the discharge portion.

3. The power unit according to claim 2, wherein the movable electrode is made movable by a spring-like electrode or an elastic force of an elastic body, and comes into contact with the low-potential electrode due to the elastic force.

4. The power unit according to claim 1, wherein the discharge portion is a resistor.

5. The power unit according to claim 1, wherein the discharge portion is a direct cable.

* * * * *